United States Patent [19]

Gilliam et al.

[11] 4,166,873

[45] Sep. 4, 1979

[54] DIISOCYANATE-MODIFIED POLYESTERS AS HOT MELT ADHESIVES AND COATINGS

[75] Inventors: Kenneth D. Gilliam, Sugar Grove; Edward E. Paschke, Wheaton, both of Ill.

[73] Assignee: Standard Oil Company (Indiana), Chicago, Ill.

[21] Appl. No.: 840,406

[22] Filed: Oct. 7, 1977

Related U.S. Application Data

[60] Continuation-in-part of Ser. No. 635,033, Nov. 25, 1975, abandoned, which is a continuation-in-part of Ser. No. 506,118, Sep. 16, 1974, abandoned, which is a division of Ser. No. 399,063, Sep. 20, 1973, abandoned.

[51] Int. Cl.² .................... D04D 7/04; B65D 11/16
[52] U.S. Cl. ................................ 428/35; 156/331; 156/332; 156/244.11; 215/12 R; 215/DIG. 6; 427/314; 427/385 A; 428/423; 428/430; 428/480; 428/424; 428/458; 528/363; 525/424

[58] Field of Search ............ 156/331, 315, 332, 321, 156/309, 322, 313, 244; 427/314, 385 P, 333, 385 R, 337, 407 R, 374, 407 A; 428/420, 430, 423, 458, 424, 480, 35; 260/75 TN, 75 NK, 77.5 CR, 77.5 AN, 858, 75 NA, 75 NE; 215/12 R, DIG. 6

[56] References Cited

U.S. PATENT DOCUMENTS

| 2,777,831 | 1/1957 | Seeger et al. ............... 260/75 NK |
| 2,876,725 | 3/1959 | Buck et al. ..................... 156/332 |
| 2,982,754 | 5/1961 | Sheffer et al. .............. 260/75 NK |
| 3,097,961 | 7/1963 | Duperriez ....................... 427/314 |
| 3,115,479 | 12/1963 | Windemuth et al. .......... 260/858 |
| 3,373,143 | 3/1968 | Chilvers et al. ............... 428/480 |

FOREIGN PATENT DOCUMENTS

| 610140 | 10/1948 | United Kingdom ............... 260/858 |
| 684400 | 12/1952 | United Kingdom ............... 156/331 |
| 756076 | 8/1956 | United Kingdom ............... 156/332 |

*Primary Examiner*—John T. Goolkasian
*Assistant Examiner*—J. J. Gallagher
*Attorney, Agent, or Firm*—Wallace L. Oliver; Arthur A. Gilkes; William T. McClain

[57] ABSTRACT

Diisocyanate-modified polyesters formed by heating 100 parts of a polyester with about 2 to 10 parts of a diisocyante to above about 260° C. are useful as superior hot melt adhesives and as durable coatings.

31 Claims, 3 Drawing Figures

DIISOCYANATE-MODIFIED POLYESTERS AS HOT MELT ADHESIVES AND COATINGS

Cross Reference to Relates Applications

This application is a continuation-in-part of U.S. patent application Ser. No. 635,033 filed Nov. 25, 1975 now abandoned, which is a continuation-in-part of U.S. patent application Ser. No. 506,118 filed Sept. 16, 1974, now abandoned, which is a division of U.S. patent application Ser. No. 399,063 filed Sept. 20, 1973, now abandoned.

BACKGROUND OF THE INVENTION

This invention relates to diisocyanate-modified polyesters and more specifically to their use as hot melt adhesives and coatings.

There is a need for polymeric substances useful as hot melt adhesives which can form structural metal-to-metal bonds. An exceptional hot melt adhesive would form bonds having T-Peel values (ASTM D 1876-69) about 50 lbs./inch-width and a Lap Shear values (ASTM D 1002-64) above 2000 psi. An especially preferred adhesive would not require pretreatment of the bonded surfaces. Further, there is a need for polymeric substances which can adhere to glass, such as bottles, to form a coating which will inhibit shattering on impact. An especially useful coating should withstand multiple washing cycles without appreciable loss of properties.

The prior art discloses the use of diisocyanates to increase the molecular weight of polymers. The prior art also shows adhesives formed from diisocyanates and polyesters where the ratio of isocyanate group to hydroxyl and carboxyl group is about unity. Relatively low-temperature reactions between diisocyanates and polyesters which leave free isocyanate groups for bonding are well known. However, it is well documented in the literature that isocyanate functionalities and urethanes decompose at temperatures above about 470° F. (243° C.). Thickwalled articles produced from a diisocyanate-modified polyester are described in U.S. Pat. No. 3,553,157. Buck et al., U.S. Pat. No. 2,876,725 discloses a method of sealing a metal seam using a copolyester heated to 300° to 550° F. In one example, Buck et al. include a triisocyanate within their copolyester adhesive which was heat activated in a seam at 425° F. The copolyesters of Buck et al. are produced by reacting a diol with a mixture of aromatic and aliphatic diacids. Other relevant prior art include U.S. Pat. Nos. 3,115,479; 3,373,143; 3,097,961; 2,982,754; and British Pat. Nos. 610,140 and 684,400.

SUMMARY OF THE INVENTION

We have discovered that certain diisocyanate-modified polyesters form superior substrate-to-substrate bonds and form durable coatings on substrates. Such a modified polyester is produced by heating a combination of about 2 to 10 parts by weight of a diisocyanate and 100 parts of a polyester having an inherent viscosity of about 0.3 and 1.5 dl./g. to a temperature above about 260° C. The modification of the polyester can occur either before or during a bonding or coating process. The inherent viscosity of the modified product is not substantially different from that of the starting polyester.

BRIEF DESCRIPTION OF THE DRAWINGS

The compositions to the right of this peak are characterized as having substantially unchanged inherent viscosities.

Brief Description of the Invention

Characteristically, the conversion of a polyester into a product useful as a hot melt adhesive or coating according to this invention involves modification of the polyester with a relatively high concentration of diisocyanate at a temperature above about 260° C. such that the inherent viscosity of the modified product is not significantly increased over that of the starting polyester. Such modification can occur before or after application of the polyester-based material to a substrate.

The substrates on which the modified polyester can be adhered are those which can withstand the bonding temperatures required. These include metals, such as steel, aluminum, copper, bronze, brass, galvanized steel, tin, tin-plated steel and the like. Also, glass and ceramic-like materials are useful substrates. The diisocyanate-modified polyesters useful in this invention can be employed both as adhesives and coatings for these materials. The most useful applications are as a hot melt adhesive to form metal-to-metal bonds and as a coating on a glass bottle.

The hot melt adhesives of this invention exhibit exceptional strengths in structural bonds between metal, glass or ceramic substrates having both high peel and shear adhesion. The exceptional adhesion can be developed without need for priming or other surface pretreatment and in most cases without prior cleaning to remove oily residues. Our adhesives have the added advantage over many known thermosetting adhesives in that they are solvent-free and require no extensive post cure. Further, they are thermoplastic and as such are not too brittle. In most applications maximum bond strength can be attained in less than one minute and excellent strength is retained to temperatures of up to 225° F.

The bonds formed using the adhesive of this invention survive a variety of environmental conditions, such as high and low temperatures, water, gasoline and calcium chloride solution. Contact of the adhesive with water before heat activation and sealing apparently has little effect on resulting bond properties.

In addition to being an adhesive, such diisocyanate-modified polyester also is useful as a coating on a substrate such as metal, glass and ceramics. These coatings exhibit a high degree of durability when exposed to washing and abrasion.

Since generally our modified polyesters do not have substantially higher inherent viscosities than the corresponding starting polyester, apparently, the modified polyester molecules have not been joined to form long chain-extended molecules. It is observed that the lower the inherent viscosity of the starting polyester, the greater is the increase of inherent viscosity of the modified product. Conversely, polyesters of greater initial inherent viscosity show less increase in inherent viscosity when modified.

The compositions useful in our invention are produced by reacting 100 parts by weight of a polyester with an initial inherent viscosity from about 0.3 to 1.5 dl./g. (60/40 phenol/s-tetrachloroethane, 30° C., 0.1 g./25 cc.) with about 2 to 10 parts by weight of a diisocyanate at temperatures above about 260° C. The resulting diisocyanate-modified polyester composition essentially contains no diisocyanate groups or urethane functionalities. This fact has been confirmed by analytical techniques including infrared, nuclear magnetic resonance, Raman, ultra violet and mass spectroscopy. Therefore, the compositions of our invention apparently do not use free isocyanate groups as bonding vehicles to a substrate. Elemental analysis confirms that essentially all nitrogen added as isocyanate is present in the modified polyester. Surprisingly, the inherent viscosity of the modified product substantially is the same as the starting polyester. Applicants cannot explain the mechanism by which the metal-to-metal bonds or the durable coatings of their invention are formed.

Modified polyester adhesives of this invention can be blended with various compatible organic and inorganic substances, such as polyesters, nylons and titanium dioxide, before sealing, although typically unblended adhesives have better bond properties than blended ones.

The polyesters useful in our invention are thermoplastics typically prepared from aromatic dicarboxylic acids or acid esters and aliphatic or cycloaliphatic diols by methods well known to the art. Although useful polyesters have inherent viscosities ranging from 0.3 to 1.5, polyesters with inherent viscosities in excess of 0.35 produce products with greater mechanical strength while polyesters with inherent viscosities under 1.0 lead to better ease of processing. The aromatic moiety in the useful aromatic dicarboxylic acid can be based upon benzene, biphenyl, naphthylene or their substituted derivatives. The aromatic diacids of greatest utility upon which the polyesters useful in our invention are based include terephthalic acid, isophthalic acid and mixtures thereof. The preferred diacid is terephthalic acid. The diols useful in preparing the polyesters in our invention are aliphatic or cycloaliphatic dihydroxy hydrocarbons containing from 2 to about 12 carbon atoms such as ethylene glycol, diethylene glycol, hexamethylene glycol and 1,12-dihydroxydodecane. Typically, the simple glycols such as ethylene glycol, propylene glycol, neopentyl glycol or mixtures thereof are useful. The preferred glycols are ethylene glycol and 1,4-butanediol (tetramethylene glycol). The preferred polyesters useful in our invention are poly(ethylene terephthalate) [PET] and poly(butylene terephthalate) [PBT]. In addition to the common commercial grades of such polyesters, scrap and even waste polyester can be useful in compositions of our invention.

The diisocyanate reactants useful in our invention are aromatic or aliphatic polyisocyanates containing from about 6 to 100 carbon atoms. Although the preferred isocyanate-containing reactants contain two isocyanate groups, reactants containing more than two such groups are operative and are included in our general definition of "diisocyanate". Isocyanate precursors which can form diisocyanates under the conditions encountered in the process of our invention are useful and are considered equivalent to the "diisocyanates" in our invention. Such precursors include nitrile carbonates such as adiponitrile carbonate and aminimides such as bis(1,1,1-trimethylene terephthalate). Typically, the diisocyanates of our invention are nonvolatile under the encountered process conditions. Generally, the preferred diisocyanates have boiling points above 280° C., although other diisocyanates are operative. Preferred diisocyanates include 4,4'-diphenylmethane diisocyanate (MDI) and its alkylated derivatives, 4,4'-diphenylether diisocyanate (ODI) and dianisidine diisocyanate, although other diisocyanates such as 2,4-tolylene diisocyanate (TDI), 2,2,4-trimethylhexamethylene diisocyanate (2,2,4-TMHMDI), 3-isocyanatemethyl-3,5,5-trimethylcyclohexyl isocyanate and 1,6-hexamethylene diisocyanate are operative. The most preferred diisocyanate is MDI.

Figure 1:
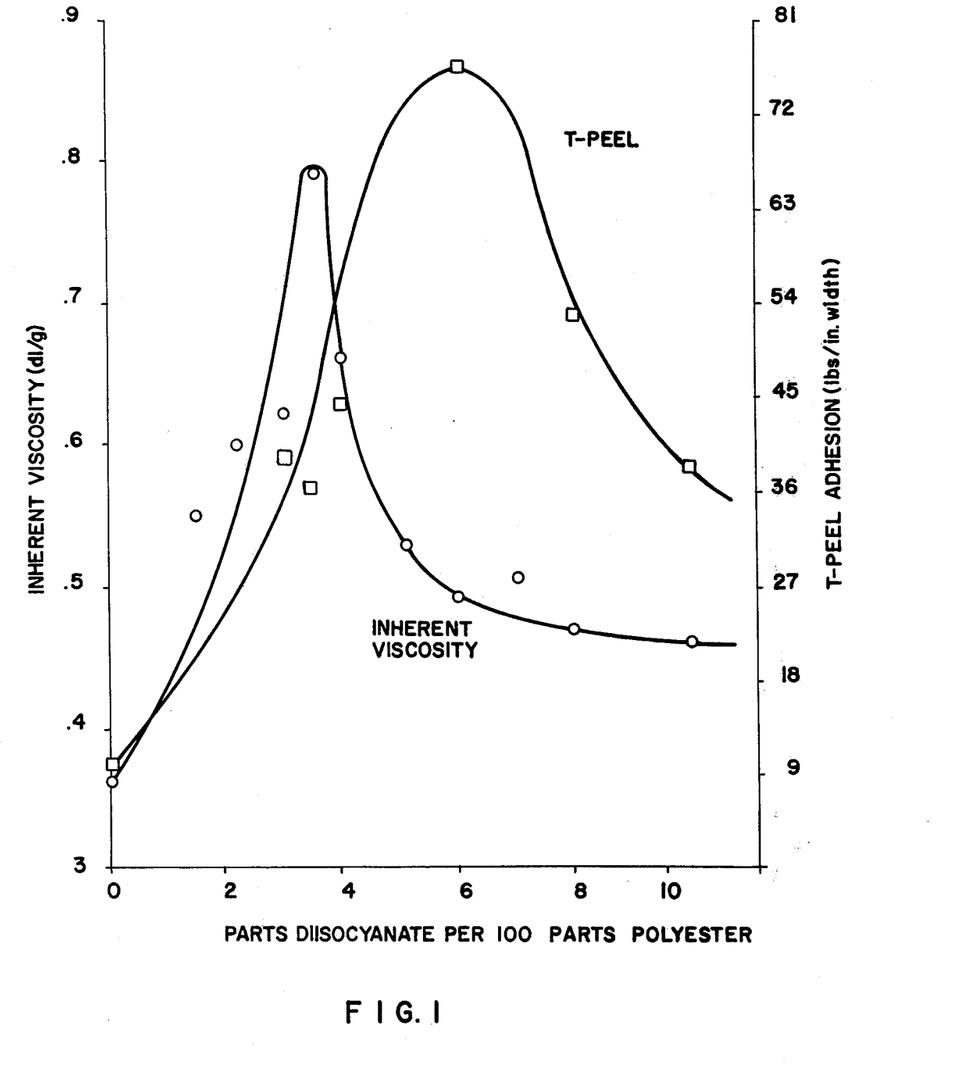
FIG. 1 shows the inherent viscosity (I.V.) and associated T-Peel adhesion values for various diisocyanate-modified polyesters as a function of diisocyanate incorporated within the polyester. The peak in the I.V. curve can be interpreted as resulting from chain-coupling, cross-linking or both and corresponds to an increase in molecular weight.

The amount of diisocyanate used in preparing the compositions of our invention can vary from about 2 to 10 parts by weight per 100 parts by weight (phr) of polyester. Preferably, the minimum effective amount of diisocyanate should be used such that the inherent viscosity of the modified polyester substantially is the same as the starting polyester. Usually, the optimum amount of diisocyanate is a function of the viscosity of the starting polyester. Typically, as the inherent viscosity of the starting polyester increases, the optimum amount of diisocyanate (as determined by a lack of change in the modified product) will decrease. As is seen in FIG. 1, a modified PET with an initial inherent viscosity of about 0.36 exhibits a peak in viscosity at about 3.5 parts of diisocyanate per 100 parts of PET. For the system illustrated in FIG. 1, the T-Peel adhesion value is at a maximum at about 6 parts of diisocyanate per 100 parts of polyester. This optimum diisocyanate amount is typical of many modified polyester systems, although at higher starting inherent viscosities the actual maximum is less pronounced. Typically, a modification with 6 phr of diisocyanate is operative, although modification with 2 phr of diisocyanate has yielded superior results.

In a bulk process, the diisocyanate and polyester are combined and then heated above about 260° C. which activates the chemical reaction between the polyester and the diisocyanate. The resulting modified product can be cooled and stored before being used later as a hot melt adhesive. When a polyester sheet is coated with a diisocyanate at room temperature, little, if any, chemical reaction occurs. However, when the coated sheet is placed between two substrates and compressed under heat, a chemical reaction occurs between the diisocyanate and polyester and essentially simultaneously between the chemically modified polyester and the substrates. A similar result occurs when the substrates are coated with diisocyanate and compressed under heat with an intermediate layer of polyester sheet. In one embodiment of this invention, polyester is chemically modified by reacting with the diisocyanate prior to adhesion. This chemical reaction conveniently can be performed in solution, in a slurry or in the melt state and takes place within a fraction of a minute to about twenty minutes at temperatures from about 260° C. to 320° C. with constant stirring. The reaction conveniently can be performed in a Helicone reactor in about 4 to 15 minutes at above the melt temerature of the polyester, which for PET a temperature of about 285° C. is sufficient. This reaction can also be performed in the barrel of an extruder with residence times of less than about two minutes. Adhesives of higher T-Peel values may be prepared by increasing the temperature in the extruder. Multiple passes can be used if necessary and optionally the extruder can be used as a means to apply the hot melt adhesive directly to the surfaces to be bonded. However, in this embodiment, a resinous diisocyanate modified polyester usually is recovered. The product usually will have an off-white to tan coloration with an inherent viscosity not significantly different than the viscosity of the starting polyester. Thus, for PET the inherent viscosity will start somewhere between about 0.3 to 1.0 and the recovered modified adhesive will remain between these limits. Typically, a substantial increaase in viscosity leads to subsequent processing and aesthetic appearance problems while a substantial decrease means degradation of the polymer and an associated loss of adhesive strength.

The diisocyanate-modified polyesters of this specific embodiment can be manufactured and used in a variety of forms including pellet, powder, fiber, film, granule or rod and can be used as hot melt adhesives and glass coatings in a variety of application techniques including heat activation of the adhesive granules, heat activation of the extruded films and extrusion laminations. In one adhesive technique, ground adhesive particles (about 20 mesh) are placed between two surfaces to be adhered and heated under slight pressure to the application temperature. Alternatively, pre-extruded film can replace the granules. Extrusion lamination is a standard hot melt application procedure. For satisfactory application of the preferred PET adhesive the modified polyester should be dry and an application temperature above about 260° C. should be used. Table I summarizes the average physical and adhesive properties of such application.

TABLE I

| Average Physical Properties: | |
|---|---|
| Tensile Strength, psi | |
| at yield | 9,720 |
| at break | 5,130 |
| Elongation, % | |
| at yield | 8.5 |
| at break | 96 |
| Fisher-Johns Melting Point, °F. | 475–500 |
| Specific Gravity | 1.33 |
| Average Adhesive Properties: | |
| Lap Shear, psi at 72° F. | |
| Degreased Steel (0.64 in.) | 3,010 |
| Anodized Aluminum (0.64 in.) | 2,310 |
| Oil-Coated Steel (0.032 in.) | |
| after 30 days in gasoline | 2,180 |
| after 30 days in water | 1,650 |
| after 30 days in 5% $CaCl_2$ | 1,625 |
| after 15 min. at 275° F. | 2,490 |
| T-Peel, lbs/in.-width at 72° F. | |
| Steel + Bonderite 1000 (0.026 in.) | 83.0 |
| Anodized Aluminum (0.020 in.) | 46.0 |
| Epoxy-Phenolic Coated Tin-Free Steel | |
| Can Stock (0.006 in.) | 26.0 |

In another embodiment of this invention, a hot melt adhesive is produced by coating a polyester with 2 to 10 parts by weight of a diisocyanate per 100 parts of polyester. This coating is accomplished at sufficiently low temperatures that no significant chemical reaction occurs. Examples of such methods are solution coating followed by solvent evaporation, direct powder blending and powder coating at ambient conditions. The polyester of this embodiment can be any convenient form including a powder, film, fiber and woven or nonwoven fabric. The diisocyanate-coated polyester can then be placed between the surfaces to be bonded and heat activated at temperatures greater than about 260° C. under pressure for up to 20 minutes to achieve adhesive properties similar to the previous specific embodiment. The preferred method in this embodiment involves placing equal weights of a PET fabric and a 6% solution of MDI in hexane in a closed container and then removing the hexane by vacuum distillation. The diisocyanate-coated cloth then can serve as the adhesive yielding optimum adhesion at an activation temperature of about 360° C.

In still another embodiment of this invention the surfaces to be bonded are pre-coated with from 2 to 10 parts by weight of diisocyanate per 100 parts by weight of polyester. Then, the polyester in any suitable form is placed between the surfaces and heat activated under pressure at a temperature greater than about 260° C. The heat activation is maintained for up to 20 minutes at preferably 350° C. for PET or about 305° C. for PBT. A surface to surface bond of exceptional peel resistance and shear strength can be achieved.

When diisocyanate is applied to a polyester sheet or applied to the substrate surface before bonding, the concentration of diisocyanate with respect to the polyester is difficult to measure. It is believed that the operable concentrations of diisocyanate actually in contact with the polyester sheet or fabric is similar to that in the bulk process. However, due to insufficient mixing between the diisocyanate and polyester fabric, higher bulk concentrations of diisocyanate may be applied.

When adhesively bonding two surfaces according to this invention, the strength of the bond achieved will not only be a function of the hot melt adhesive composition but also of the surfaces and the application conditions such as the temperature. Generally an application temperature in excess of about 260° C. is required to create high T-Peel adhesion. For modified PET, an application temperature of 305° C. usually is required to achieve a T-Peel value of 50 while the optimum value usually requires 350° C. (optimum in the sense that T-Peel values of greater than 60 are achieved in 10 seconds at 20 psi between steel sheet). For modified PBT the optimum application temperature is about 305° C. with temperature above 260° being acceptable.

The diisocyanate-modified polyester of this invention can be coated onto a suitable substrate by applying such polyester to the substrate and then heating the covered substrate to a temperature sufficient to form a bond. Operative methods for covering surface include powder coating and applying a film to the substrate. In powder coating, the modified polyester is ground into a powder with particle sizes less than about 250 microns and applied to a substrate either by electrostatic spray or by fluidized bed. The covered substrate then can be baked at a temperature sufficient to form a uniform fused coating bonded onto the substrate. In another method, a film of modified polyester can be placed on the substrate and then baked. Alternatively, the modified polyester can be applied to a heated substrate such that bonding occurs as the material is applied to the substrate. In another embodiment, the polyester can be modified with diisocyanate while being applied to a substrate or after covering a substrate. In this method the temperature must exceed the modification temperature of about 260° C. When premodified resin is applied to a substrate, the baking temperatures need not be as high as 260° C. Preferably, the inherent viscosity of the starting polyester is between about 0.6 and 1.0. The higher I.V. material is needed to produce a tough, durable coating.

The following Examples demonstrate but do not limit our invention.

EXAMPLES I TO X

A series of modified polyesters were prepared by reacting various weight percents of 4,4'-diphenylether diisocyanate with a poly(ethylene terephthalate) which initially had an inherent viscosity of 0.36. Each modification reaction was performed in essentially an identical manner. First, after the unmodified PET was ground and vacuum dried, an approximately 20-gram sample of the ground PET was added to about 15 milliliters of dichloromethane. To this slurry was added the appropriate amount of 4,4'-diphenylether diisocyanate dissolved in dichloromethane. The solvent then was removed on a rotary evaporator under reduced pressure without heating. After the resulting mixture was heated at 265° to 280° C. for about 5 to 15 minutes with stirring under a nitrogen atmosphere, a tan, odorless, solid product was recovered.

These diisocyanate modified PET resins then were ground and dried overnight in a vacuum oven at 60° C. flushed with nitrogen. The polymer particles were placed between the adherends and heat activated by the use of a modified Sentinel heat sealer forming an adhesive layer of approximately 0.005 inch thick. A post compression of about 1 psi at room temperature was found to increase T-Peel values. A 24 gauge, 0.026 inch thick, phosphatized plain cold rolled panel was used as adherends for the T-Peel adhesion tests, while heavier panels, 0.064 inch thick, were employed for the Lap Shear adhesion tests. Test specimens were aged for one week at 72° F. and 50% relative humidity and then tested under these conditions. The tests were conducted according to guidelines in ASTM D 1002-64 and D 1876-69 except the number of specimens per variable were reduced because of limited quantities of polymer and the bond area for T-Peel was only 4 square inches. A comparative run was made using the unmodified polyester as an adhesive. The data for these examples as run are presented in the following Table II and are plotted in FIG. 1.

TABLE II

| Example (Run) | Parts of Diisocyanate Per 100 Parts PET | Inherent[1] Viscosity | Lap[2] Shear | T-Peel[3] |
|---|---|---|---|---|
| (A) | 0 | 0.36 | 1,920 | 10.4 |
| I | 1.5 | 0.55 | 2,775 | 9.7 |
| II | 2.2 | 0.61 | | |
| III | 3.0 | 0.62 | 2,735 | 39.7 |
| IV | 3.5 | 0.79 | 2,300 | 36.4 |
| V | 4.0 | 0.66 | 2,770 | 44.6 |
| VI | 5.0 | 0.53 | | |
| VII | 6.0 | 0.49 | 1,965 | 76.4 |
| VIII | 7.0 | 0.51 | | |
| IX | 8.0 | 0.47 | 2,700 | 52.8 |
| X | 10.0 | 0.46 | 2,155 | 38.2 |

[1]60/40 phenol/s-tetrachloroethane, 30° C., 0.1 g./25 cc. dl./g.
[2]ASTM D 1002-64 at a 0.05 in./min. load (psi)
[3]ASTM D 1876-69 at a 10 in./min. load (lbs./inch-width)

The modified PET exhibited improved Lap Shear across a broad range of concentrations of diisocyanate. While the particular compositions of interest in this invention exhibited a definite optimum T-Peel at six weight percent diisocyanate. These compositions which possess both high peel and high shear adhesion are confined to a rather narrow range of weight percent in that the optimum T-Peel drops off sharply as the concentration varies to either side of the maximum. Furthermore, these compositions with optimum adhesion have inherent viscosities that correspond to molecular weights that have not been significantly altered by chain-extension and, thus, involve the incorporation of diisocyanate without significant cross-linking.

EXAMPLES XI TO XXV

A series of three poly(ethylene terephthalate) polymers representative of the accepted range of commercial grade materials were modified by the addition of 6 parts MDI per 100 parts of PET. Example XI was modified in glassware in a manner similar to Examples I through X. Example XXII is a repeat (for comparison purposes) of Example VII. Examples XXIII through XXV were modified by melt blending the diisocyanate with the PET in a 24-inch long, one-inch diameter, single-screw Killion extruder. The melt blending was accomplished by a single pass through the extruder which during a run was operated at 20 to 200 rpm with temperatures along the extruder ranging from 430° to 600° F. As seen in Table III, the modified PET consistently displayed average T-Peel adhesions in excess of 60 lbs./inch-width and final inherent viscosities that are not significantly different than those of the starting material. All samples had Lap Shear strengths of about 2,000 psi or greater.

TABLE III

| | Inherent Viscosity[1] | | T-Peel Adhesion[2] (pli) | |
|---|---|---|---|---|
| Example | Starting | Modified | Starting | Modified |
| XI | 0.36 | 0.48 | 10.4 | 60.4 |
| XII | 0.36 | 0.49 | 10.4 | 76.4 |
| XIII | 0.64 | 0.56 | 33.7 | 75.9 |
| XIV | 0.64 | 0.59 | 33.7 | 84.3 |
| XV | 0.64 | 0.62 | 33.7 | 86.6 |
| XVI | 0.64 | 0.63 | 33.7 | 74.2 |
| XVII | 0.64 | 0.63 | 33.7 | 81.3 |
| XVIII | 0.64 | 0.66 | 33.7 | 70.4 |
| XIX | 0.64 | 0.66 | 33.7 | 84.3 |
| XX | 0.64 | 0.69 | 33.7 | 97.8 |
| XXI | 0.64 | 0.72 | 33.7 | 63.7 |
| XXII | 0.64 | 0.72[3] | 33.7 | 107.3 |
| XXIII | 0.64 | 0.86 | 33.7 | 96.4 |
| XXIV | 1.0 | 0.92 | 46.8 | 62.6 |
| XXV | 1.0 | 1.14 | 46.8 | 72.8 |

[1]60/40 phenol/tetrachloroethane, 30° C., 0.1 g./25cc.
[2]ASTM D 1876-69 (lbs./inch-width)
[3]Modified with liquid alkylated MDI.

EXAMPLE XXVI

To 100 grams of poly(butylene terephthalate) were added 6 grams of 4,4'-diphenylmethane diisocyanate. The mixture was stirred in a three-neck flask for 25 minutes at 260° C. After cooling, the solid, modified PBT as well as a sample of the starting material were ground, vacuum dried, and molded between strips of cold rolled steel. The specimens were tested for Lap Shear and T-Peel adhesion essentially as described by ASTM D 1002-64 and D 1876-69 respectively. The Lap Shear increased from 1095 psi for the unmodified PBT to 4100 psi for the diisocyanate-modified PBT while the T-Peel increased from 19.0 lbs./inch-width to 94.8 lbs./inch-width.

EXAMPLE XXVII

In a manner similar to Example XXVI, a 100 gram sample of a polyester, having an inherent viscosity of 0.55 and formed from dimethyl terephthalate and a 60/40 mole ratio of ethylene glycol and neopentyl glycol, was modified by reacting it with 6 grams of MDI at 220° C. for 20 minutes. Again, the modified polyester, as well as an unmodified control, was ground, vacuum dried and molded between strips of bonderized 24 gauge steel. A Sentinel bar sealer set at 620° F. for 10 seconds at 20 psi was used. The average T-Peel adhesion value using the unmodified polyester was 21.8 lbs./inch-width while the modified polyester value increased to 65.7 lbs/inch-width.

EXAMPLE XXVIII

Six grams of MDI were added to 100 grams of a polyester formed from dimethyl terephthalate, dimethyl isophthalate and 1,4-cyclohexanedimethanol, sold by Eastman Chemical Products, Inc. as resin 7DRO. The diisocyanate-polyester mixture was modified by heating for 20 minutes at 260° C. Both the modified and the original polyester were molded between strips of cold rolled steel using a Sentinel bar sealer at 560° F. for 10 seconds at 20 psi. The resulting average T-Peel adhesion value using the unmodified polyester was 23.2 lbs./inch-width while the diisocyanate-polyester adhesion value was 52.0 lbs./inch-width.

EXAMPLE XXIX

A mixture containing six parts of MDI and 100 parts of PET having an inherent viscosity of 0.64 dl./g. was passed through a one-inch Killion extruder operating at 27–28 rpm and at a die gap of 0.030". The four temperature zones in the extruder were 450° F., 540° F., 480° F. and 430° F. and the total average residence time for the resin in the extruder barrel was 145 seconds. The resulting modified polyester having an I.V. of 0.69 dl./g. was applied to steel plates and bonded at a pressure of less than 20 psi at 660° F. as described in Examples I-X.

The average T-Peel over 16 samples was 97.8 lbs./inch-width and the average Lap Shear over three samples was 4170 psi.

EXAMPLE XXX

A series of three mixtures of 2 parts of MDI and 100 parts of PET (American Enka T-716) were passed through a one-inch Killion extruder operating at a speed of 77–78 rpm and a die gap of 0.020". The temperature zones in the extruder were 500° F., 550° F. and 500° F. The steel-to-steel bonding results for the three different modified polyester samples are shown in Table IV.

TABLE IV

| Inherent Viscosity (dl/g) | Average T-Peel (lbs/inch-width) | Average Lap Shear (psi) |
| --- | --- | --- |
| 0.71 | 81.7 | 2565 |
| 0.71 | 97.7 | 2485 |
| — | 112.3 | 3325 |

Approximately 4"×4" glass plates were coated with a 5-mil film of the modified polyester described above by pressing a cold film against hot glass. The resistance to impact was measured using a falling ball test with the results given in Table V.

TABLE V

| | Impact Required to Break Glass Plates (inch-pounds) | |
| --- | --- | --- |
| Substrate | Not Coated | Coated |
| Single-weight glass | 5–8 | 160 (1) |
| Double-weight glass | 8–12 | No Breakage |

(1) Glass pieces held to resin film.

A series of soft drink bottles heated at 650° F. were electrostatically powder coated with modified polyester described above and annealed at 650° F. to form a fused coating of about 2.2 mils thickness. Samples of such coated bottles were drop tested from a height of 10 feet. The statistical index on the drop tests was 18 to 20 which is equivalent to commercial coating systems on non-returnable bottles. Other samples of the coated bottles were washed repeatedly in a detergent solution. The coating lasted through 9 to 11 wash cycles.

EXAMPLES XXXI-XXXVIII

T-Peel values were determined for a series of adhesives subjected to a variety of activation temperatures using procedures described in Examples I-X. The polyesters used were poly-cyclohexylenedimethylene terephthalate/isophthalate [75% terephthalate-25% isophthalate] (PCDTI) and mixtures of PCDTI with PET or PBT which were modified with 6 phr of MDI in an extruder. The results are shown in Table VI.

TABLE VI

| Example (Run) | Composition | Average T-Peel (pli) versus Activation Temperature (°F.) | | | | | | | |
| --- | --- | --- | --- | --- | --- | --- | --- | --- | --- |
| | | 440 | 480 | 520 | 560 | 600 | 640 | 680 | 720 |
| (B) | PCDTI | 16.3 | 28.1 | 18.1 | 23.2 | 8.3 | 13.2 | — | — |
| XXXI | PCDTI + MDI | 22.8 | 34.7 | 46.3 | 43.4 | 51.2 | 52.2 | — | — |
| (C) | 50/50 - PET/PCDTI | — | — | 18.5 | 22.7 | 19.2 | 25.2 | 19.2 | 21.2 |
| XXXII | 50/50 - PET + MDI/PCDTI + MDI | — | — | 8.4 | 20.8 | 38.5 | 47.0 | 58.6 | 65.7 |
| XXXIII | 50/50 - PET/PCDTI + MDI | — | 13.5 | 34.3 | 38.3 | 60.8 | 70.8 | 73.8 | — |
| (D) | 50/50 - PBT + PCDTI | — | 40.6 | 29.8 | 34.0 | 34.0 | 24.3 | 24.2 | 19.1 |
| XXXIV | 50/50 - PBT/PCDTI + MDI | — | 19.2 | 53.0 | 58.4 | 68.7 | 64.5 | 66.6 | — |
| XXXV | | — | 23.1 | 56.2 | 69.0 | 69.0 | 73.0 | 72.3 | — |
| XXXVI | | — | — | 41.8 | 48.7 | 64.0 | 64.8 | 64.8 | 67.8 |
| (E) | PET/PBT/PCDTI | — | — | — | 11.2 | 38.0 | 34.4 | 35.8 | 23.0 |
| XXXVII | PET/PBT/PCDTI + MDI | — | — | — | 35.0 | 55.2 | 57.9 | 60.8 | 61.3 |
| XXXVIII | | — | — | — | 30.1 | 55.1 | 61.1 | 59.2 | 59.1 |

EXAMPLE XXXIX

Figure 2:
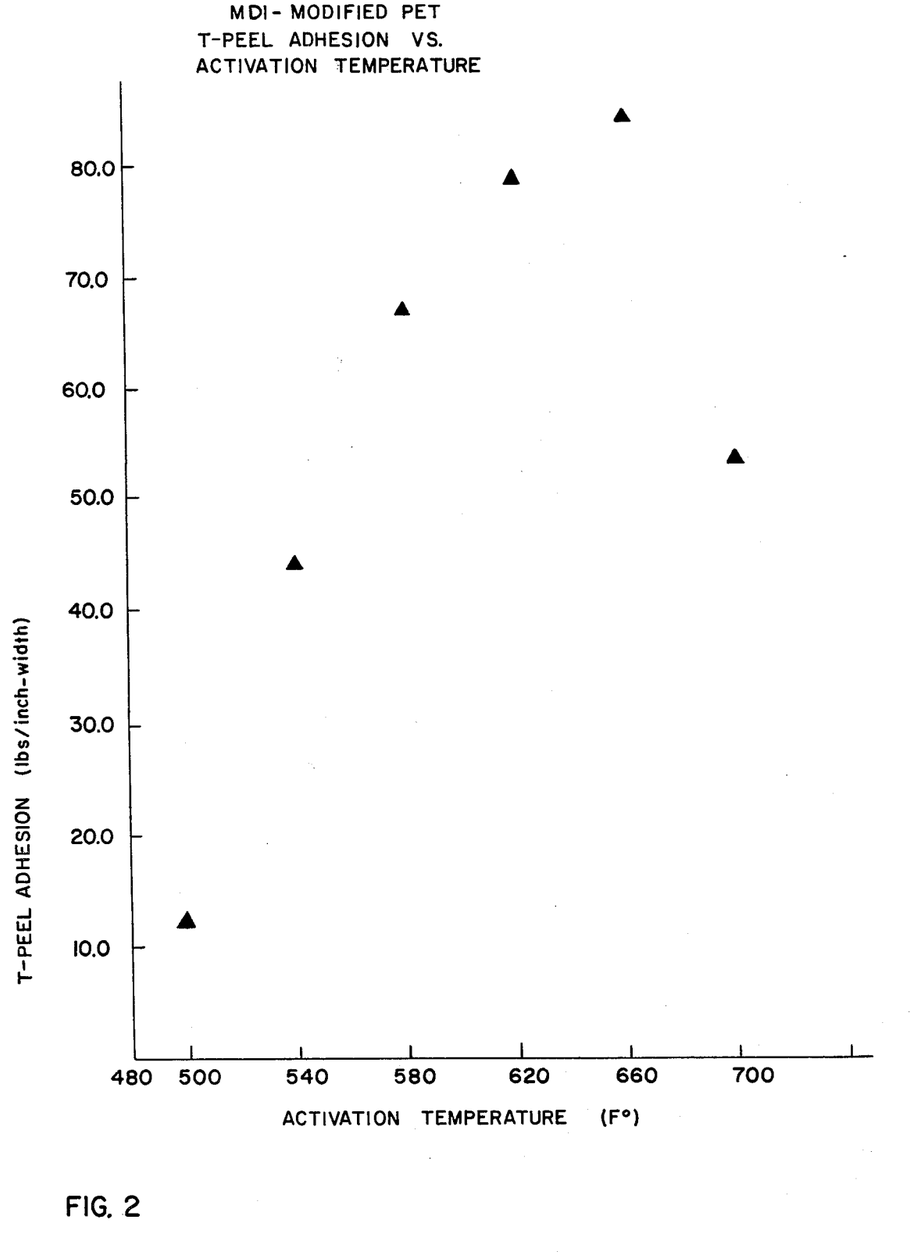
FIG. 2 shows T-Peel vs. Activation Temperature using cold rolled steel substrates with an adhesive prepared by modifying poly(ethylene terephthalate) [PET] with 4,4'-diphenylmethane diisocyanate [MDI].
Figure 3:
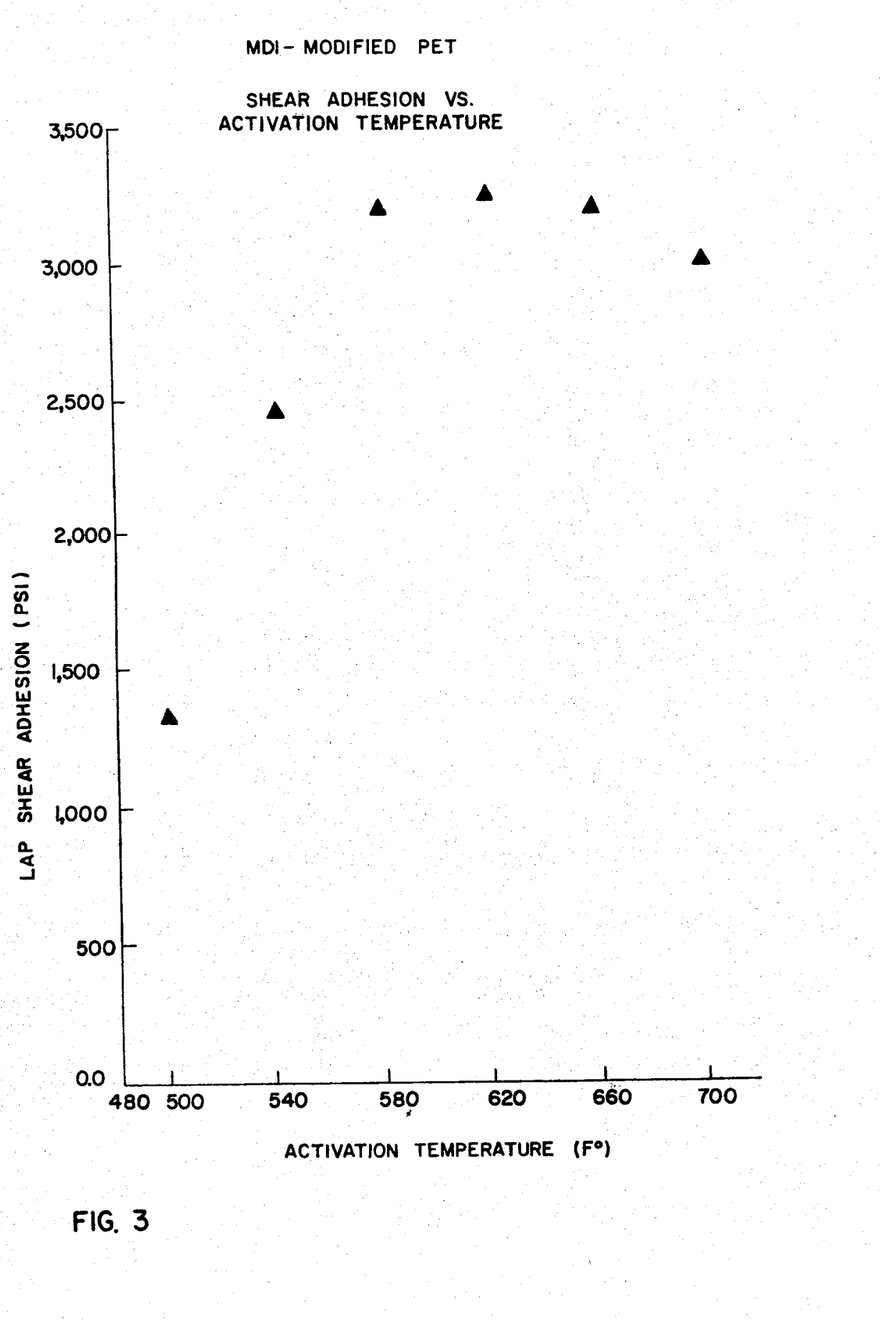
FIG. 3 shows Lap Shear vs. Activation Temperature using cold rolled steel substrates with an adhesive prepared by modifying PET with MDI.

A series of T-Peel and Lap Shear values were obtained using a diisocyanate modified polyester adhesive of this invention. In this Example, PET (0.64 I.V.) was modified with 6 phr of MDI in a Killion extruder. For the T-Peel tests, such modified polyester was placed on 1×6×0.026 inch panels of cold rolled steel and placed in a Sentinel Heat Sealer for 10 seconds at 20 psi. A post-compression of about 1 psi was maintained. Lap Shear was measured using degreased 1×4×0.032 inch cold rolled steel panels using a Sentinel Heat Sealer for 15 seconds at 20 psi. A series of tests were performed using various activation temperatures. The results are shown in Table VII and in FIGS. 2 and 3.

TABLE VII

| Activation Temperature (°F.) | Average T-Peel (pli) | Average Lap Shear (psi) |
| --- | --- | --- |
| 480 | (1) | (1) |
| 500 | 12.5 | 1363 |
| 540 | 44.8 | 2455 |
| 580 | 67.0 | 3205 |
| 620 | 78.7 | 3260 |
| 660 | 84.2 | 3200 |
| 700 | 53.4 | 3015 |

(1) Polyester did not melt at this temperature.

EXAMPLE XL

Adhesives of this invention prepared by a method described in Examples XXIII–XXV were compared to commercially available hot melt adhesives. Each adhesive was tested for Lap Shear and T-Peel using a Sentinel bar type heat sealer at a temperature chosen to give the highest T-Peel. Specimens were conditioned for one week at 72° F. and 50 percent relative humidity prior to testing. The results of tests at −40° F., ambient and 225° F. are shown in Table VIII.

TABLE VIII

| Adhesive | Average Lap Shear (psi) | | | Average T-Peel (pli) | | |
| --- | --- | --- | --- | --- | --- | --- |
| | −40° F. | Ambient | 225° F. | −40° F. | Ambient | 225° F. |
| Example XXXI | 3,780 | 2,535 | 1,030 | 15.3 | 76.4 | 70.9 |
| USM-5177-1012 | 3,050 | 1,680 | 72.5 | 6.6 | 52.7 | 34.0 |
| Eastman HPA 225M | 2,190 | 2,095 | 690 | 31.3 | 55.3 | 37.2 |
| Eastman HPA 167 | 2,195 | 1,015 | 525 | 12.2 | 20.7 | 38.2 |
| Eastman HPA 167M | 1,720 | 1,300 | 298 | 70.9 | 72.9 | 38.1 |
| General Mills Versalon 1165 | 1,390 | 468 | 20.0 | 0.8 | 62.8 | 1.9 |

EXAMPLE XLI

An adhesive similar to that prepared in Examples XXIII-XXV was tested for Lap Shear and T-Peel and then retested after one year. The results are shown in Table IX.

TABLE IX

| | Average Lap Shear (psi) | Average T-Peel (pli) |
| --- | --- | --- |
| Original | 3290 | 80 |
| After 1 year | 3290 | 70 |

We claim:

1. A process for adhering surfaces comprising:
    (a) combining about 2 to 10 parts by weight of a diisocyanate with 100 parts of a polyester essentially formed from a wholly aromatic diacid or diester component and an aliphatic or cycloaliphatic diol component and having an inherent viscosity of about 0.3 to 1.5 dl/g;
    (b) modifying the polyester by heating the combination above the melt temperature of the polyester and at least above about 260° C. while mixing;
    (c) placing the modified polyester between the surfaces;
    (d) compressing the surfaces and modified polyester at a temperature above the softening point of the modified polyester; and
    (e) cooling the bonded surfaces.

2. The process of claim 1 wherein the polyester is poly(ethylene terephthalate).

3. The process of claim 2 wherein the amount of diisocyanate is about 6 parts per 100 parts of poly(ethylene terephthalate).

4. The process of claim 1 wherein the diisocyanate is 4,4'-diphenylmethane diisocyanate, 4,4'-diphenylether diisocyanate or dianisidine diisocyanate.

5. The process of claim 4 wherein the polyester is poly(ethylene terephthalate).

6. The process of claim 1 wherein the modified polyester is recovered before placing such modified polyester between the surfaces to be bonded.

7. The process of claim 1 wherein the modified polyester is formed in an extruder.

8. The process of claim 5 wherein the modified polyester is formed in an extruder.

9. Articles adhesively bonded together by the process of claim 1.

10. A process for adhering surfaces comprising:
    (a) coating the surfaces with a diisocyanate;
    (b) placing a polyester sheet, essentially formed from a wholly aromatic diacid or diester component and an aliphatic or cycloaliphatic diol component, between the coated surfaces;
    (c) heating the coated surfaces and polyester under compression to a temperature at least above about 260° C.; and
    (d) cooling the bonded surfaces.

11. The process of claim 10 wherein the diisocyanate is 4,4'diphenylmethane diisocyanate, 4,4'-diphenylether diisocyanate or dianisidine diisocyanate.

12. The process of claim 11 wherein the polyester is poly(ethylene terephthalate).

13. Articles adhesively bonded using the process of claim 10.

14. A process for adhering surfaces comprising:
    (a) coating a polyester sheet with a diisocyanate;
    (b) placing such a coated polyester sheet, essentially formed from a wholly aromatic diacid or diester component and an aliphatic or cycloaliphatic diol component, between the surfaces;
    (c) heating the surfaces and polyester under compression to a temperature at least above about 260° C.; and
    (d) cooling the bonded surfaces.

15. The process of claim 14 wherein the diisocyanate is 4,4'-diphenylmethane diisocyanate, 4,4'-diphenylether diisocyanate or dianisidine diisocyanate.

16. The process of claim 14 wherein the polyester sheet is an extruded film.

17. The process of claim 14 wherein the polyester sheet is a fabric.

18. The process of claim 15 wherein the coated polyester sheet is a poly(ethylene terephthalate) woven fabric coated with from about 2 to 10 parts by weight diisocyanate per 100 parts of polyester.

19. Articles adhesively bonded using the method of claim 14.

20. A process for forming a durable resin coating on a substrate comprising:
   (a) combining about 2 to 10 parts by weight of a diisocyanate with 100 parts of a polyester essentially formed from a wholly aromatic diacid or diester component and an aliphatic or cycloaliphatic diol component and having an inherent viscosity of about 0.3 to 1.5 dl/g;
   (b) modifying the polyester by heating the combination above the melt temperature of the polyester and at least above about 260° C. while mixing;
   (c) covering the substrate with the modified polyester resin;
   (d) heating the covered substrate to a temperature sufficient to fuse the resin; and
   (e) cooling the coated substrate.

21. The process of claim 20 wherein the polyester is poly(ethylene terephthalate).

22. The process of claim 21 wherein the inherent viscosity of the polyester is about 0.6 to 1.0 dl./g.

23. The process of claim 22 wherein the diisocyanate is 4,4'-diphenylmethane diisocyanate, 4,4'-diphenylether diisocyanate or dianisidine diisocyanate.

24. A glass bottle coated using the process of claim 20.

25. A process for forming a durable resin coating on a substrate comprising:
   (a) combining about 2 to 10 parts by weight of a diisocyanate with 100 parts of a polyester essentially formed from a wholly aromatic diacid or diester component and an aliphatic or cycloaliphatic diol component and having an inherent viscosity of about 0.3 to 1.5 dl./g.;
   (b) covering the substrate with the resin combination;
   (c) heating the substrate to a temperature sufficient to fuse the resin and at least above about 260° C.; and
   (d) cooling the coated substrate.

26. The process of claim 25 wherein the polyester is poly(ethylene terephthalate) having an inherent viscosity of about 0.6 to 1.0 dl./g.

27. The process of claim 26 wherein the diisocyanate is 4,4'-diphenylether diisocyanate, 4,4'-diphenylmethane diisocyanate or dianisidine diisocyanate.

28. A glass bottle coated using the process of claim 25.

29. A process for forming a durable resin coating on a substrate comprising:
   (a) combining about 2 to 10 parts by weight of a diisocyanate with 100 parts of a polyester essentially formed from a wholly aromatic diacid or diester component and an aliphatic or cycloaliphatic diol component and having an inherent viscosity of about 0.3 to 1.5 dl./g.;
   (b) covering the substrate, heated to a temperature sufficient to fuse the resin combination and at least above about 260° C., with the resin combination; and
   (c) cooling the coated substrate.

30. The process of claim 29 wherein the polyester is poly(ethylene terephthalate) having an inherent viscosity of about 0.6 to 1.0 dl./g. and the diisocyanate is 4,4'-diphenylmethane diisocyanate, 4,4'-diphenylether diisocyanate or dianisidine diisocyanate.

31. A glass bottle coated using the process of claim 29.

* * * * *

UNITED STATES PATENT OFFICE
CERTIFICATE OF CORRECTION

Patent No. 4,166,873    Dated September 4, 1979

Inventor(s) Kenneth D. Gilliam and Edward E. Paschke

It is certified that error appears in the above-identified patent and that said Letters Patent are hereby corrected as shown below:

| Patent Column | Line | |
|---|---|---|
| 1 | 5 | "Relates" should be --Related-- |
| 1 | 23 | "about 50" should be --above 50-- |
| 1 | 63 | "0.3 and" should be --0.3 to-- |
| 5 | 16 | "increaase" should be --increase-- |

Signed and Sealed this

Twenty-second Day of July 1980

[SEAL]

Attest:

SIDNEY A. DIAMOND

Attesting Officer

Commissioner of Patents and Trademarks